(12) United States Patent
Scheitlin et al.

(10) Patent No.: US 9,297,904 B2
(45) Date of Patent: Mar. 29, 2016

(54) SYSTEMS AND METHODS FOR MONITORING BROADBAND RADIO FREQUENCY INTERFERENCE

(71) Applicant: Honeywell International Inc., Morristown, NJ (US)

(72) Inventors: Joseph E. Scheitlin, Plymouth, MN (US); Mats Anders Brenner, Plymouth, MN (US); John M. Howard, St. Paul, MN (US); Kim Class, Andover, MN (US)

(73) Assignee: Honeywell International Inc., Morris Plains, NJ (US)

( * ) Notice: Subject to any disclaimer, the term of this patent is extended or adjusted under 35 U.S.C. 154(b) by 651 days.

(21) Appl. No.: 13/690,231

(22) Filed: Nov. 30, 2012

(65) Prior Publication Data

US 2014/0152498 A1    Jun. 5, 2014

(51) Int. Cl.
*G01S 19/21*    (2010.01)
*G01S 19/15*    (2010.01)

(52) U.S. Cl.
CPC .............. *G01S 19/21* (2013.01); *G01S 19/15* (2013.01); *G01S 19/215* (2013.01)

(58) Field of Classification Search
CPC ........ G01S 19/21; G01S 19/15; G01S 19/215
USPC .................................................... 342/357.59
See application file for complete search history.

(56) References Cited

U.S. PATENT DOCUMENTS

| 5,995,042 A | 11/1999 | Durboraw, III et al. |
| 6,639,541 B1 | 10/2003 | Quintana et al. |
| 8,125,381 B2 * | 2/2012 | Bryant et al. ............ 342/357.59 |
| 8,159,391 B2 * | 4/2012 | Papadimitratos et al. ........................ 342/357.59 |
| 2004/0088111 A1 | 5/2004 | Ahlbrecht et al. |
| 2004/0246139 A1 | 12/2004 | Harris |
| 2004/0257275 A1 | 12/2004 | Yee et al. |
| 2005/0083231 A1 | 4/2005 | Drentea |
| 2006/0209779 A1 | 9/2006 | Rousu et al. |
| 2010/0045506 A1 | 2/2010 | Law et al. |

OTHER PUBLICATIONS

European Patent Office, "European Search Report from EP Application No. 13190552.3 mailed Apr. 22, 2014", "from Foreign Counterpart of U.S. Appl. No. 13/690,231", Apr. 22, 2014, pp. 1-4, Published in: EP.

(Continued)

*Primary Examiner* — Frank J McGue
(74) *Attorney, Agent, or Firm* — Fogg & Powers LLC

(57) ABSTRACT

Systems and methods for monitoring broadband radio frequency interference are provided. In certain embodiments, a method comprises calculating a smoothed carrier to noise value for a received signal on a processing unit, wherein the received signal is associated with a receiver and at least one satellite; calculating an average jammer power to noise power value for the receiver; calculating an instantaneous carrier to noise value for the received signal based on the average jammer power to noise power value and the smoothed carrier to noise value; comparing the instantaneous carrier to noise value to an exclusion threshold, and determining whether to exclude the received signal from calculations of global positioning data based on the comparison of the instantaneous carrier to noise value to the exclusion threshold; and when the received signal is excluded, monitoring the received signal for readmittance to the calculation of global positioning data.

20 Claims, 6 Drawing Sheets

(56) References Cited

OTHER PUBLICATIONS

McDonald et al., "Lessons Learned Through the Implementation of Space-Time Adaptive Processing Algorithms for GPS Reception in Jammed Environments", "Position Location and Navigation Symposium", Apr. 26-29, 2004, pp. 418-428.

Ndili et al., "GPS Receiver Autonomous Interference Detection", "Position Location and Navigation Symposium", Apr. 20-23, 1998, pp. 123-130.

European Patent Office, "Office Action from EP Application No. 13190552.3 mailed May 7, 2014", "from Foreign Counterpart of U.S. Appl. No. 13/690,231", May 7, 2014, pp. 1-5, Published in: EP.

* cited by examiner

SYSTEMS AND METHODS FOR MONITORING BROADBAND RADIO FREQUENCY INTERFERENCE

BACKGROUND

A global navigation satellite system receiver receives signals from satellites in a particular frequency range. In certain embodiments, the global navigation satellite system receiver is part of a ground-based augmentation system that utilizes the received satellite signals to augment the positional accuracy in certain applications. For example, ground-based augmentation systems can increase the accuracy in precision airplane approach applications. However, ground-based augmentation systems and other global navigation satellite system receivers are subject to broadband radio frequency interference that can affect the accuracy of calculations based on the received signals from the satellites. For example, some people use personal privacy devices to prevent themselves or their vehicles from being tracked by an automated global navigation satellite system tracking system. When a personal privacy device is used near a global navigation satellite system receiver, the personal privacy device creates broadband radio frequency interference that affects the accuracy of calculations based on received satellite signals.

SUMMARY

Systems and methods for monitoring broadband radio frequency interference are provided. In certain embodiments, a method comprises calculating a smoothed carrier to noise value for at least one received signal on a processing unit, wherein the at least one received signal is associated with at least one receiver and at least one satellite; calculating an average jammer power to noise power value for the at least one receiver; and calculating an instantaneous carrier to noise value for the at least one received signal based on the average jammer power to noise power value and the smoothed carrier to noise value. Further, the method comprises comparing the instantaneous carrier to noise value to an exclusion threshold, and determining whether to exclude the at least one received signal from calculations of global positioning data based on the comparison of the instantaneous carrier to noise value to the exclusion threshold; and when the at least one received signal is excluded, monitoring the at least one received signal for readmittance to the calculation of global positioning data.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
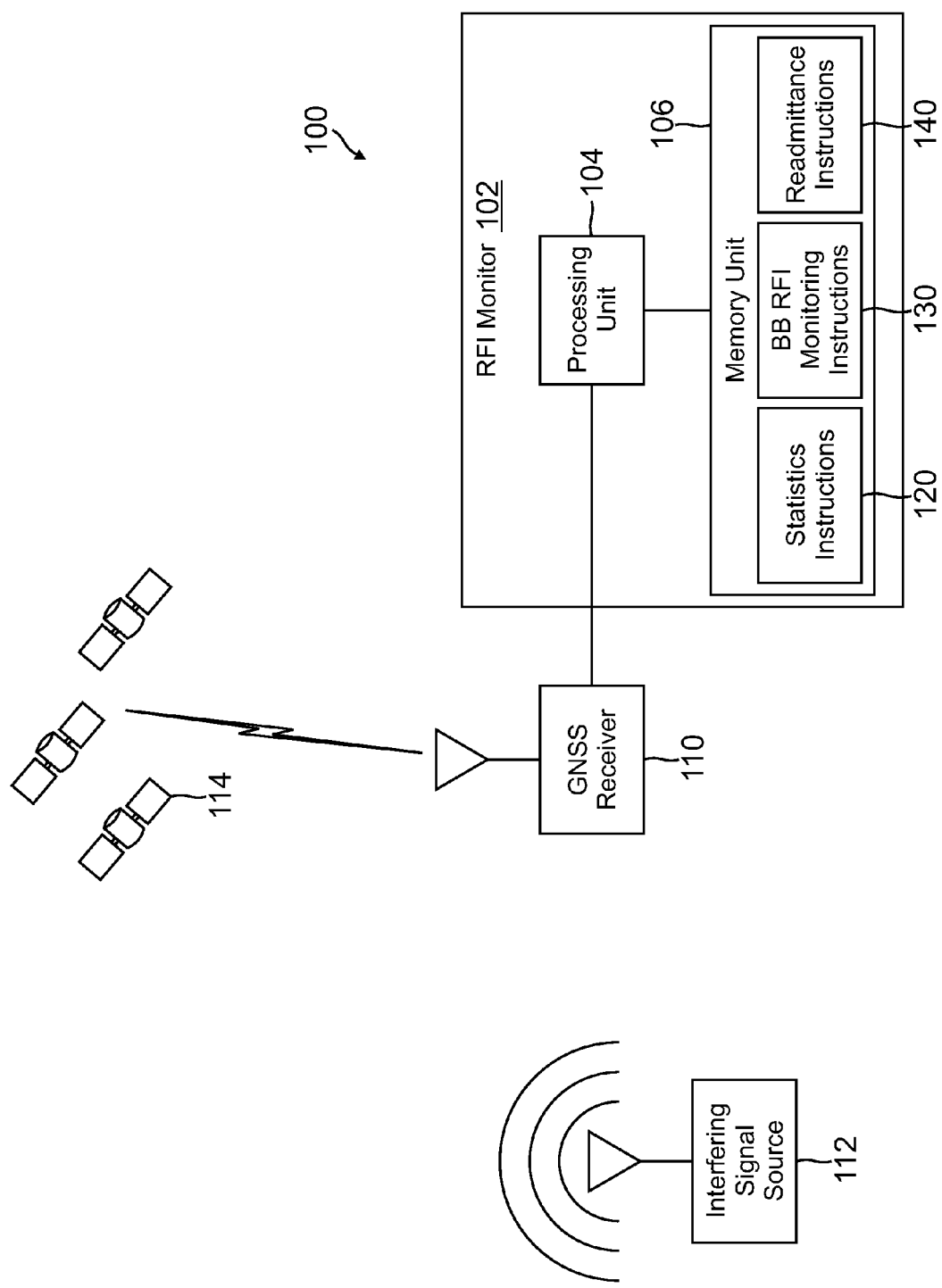
FIG. 1 is a block diagram of a system for monitoring broadband radio frequency interference in one embodiment described in the present disclosure.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to e taken in a limiting sense.

Embodiments described in the present disclosure discuss systems and methods for monitoring broadband radio frequency interference (RFI) by a global navigation satellite system (GNSS) receiver. In particular, an RFI monitor determines the presence of broadband RFI by evaluating the carrier-to-noise (C/N0) level of all satellites currently tracked by a GNSS receiver. To determine the presence of broadband RFI, the RFI monitor compares a smoothed C/N0 value against a present C/N0 value. Based on the comparison between the smoothed C/N0 value and the present C/N0 value across all GNSS satellites signal received by the GNSS receiver, the RFI monitor determines whether signals from satellites are affected by broadband RFI. If a signal from a satellite is adversely affected by broadband RFI, the RFI monitor excludes information acquired from the affected satellite when making calculations based on satellite information FIG. 1 is a block diagram of a system 100 that receives GNSS signals and monitors the signals for broadband radio frequency interference (RFI) in relation to signals received from GNSS satellites 114. For example, in at least one implementation, the GNSS satellites 114 provide signals as part of a GPS, a GLONASS, a Galileo system, a Compass system, or the like. System 100 includes an RFI monitor 102 that is connected to at least one GNSS receiver 110. The phrase "GNSS receiver," as used herein refers to a receiver that receives signals from at least one GNSS satellite 114 through an antenna and prepares the signal for further processing by an RFI Monitor 102 or other processing system. In certain implementations, the RFI monitor 102 is connected to multiple GNSS receivers 110. When the RFI monitor 102 is connected to multiple GNSS receivers 110, the RFI monitor 102 may monitor each GNSS receiver 110 individually for broadband RFI.

When monitoring a GNSS receiver 110 for broadband RFI, the RFI monitor 102 receives a signal from each satellite 114 through the GNSS receiver 110. The RFI monitor 102 determines from the signals received from the GNSS receiver 110 whether the system 100 is operating in the presence of an interfering signal source 112. In certain implementations, the interfering signal source 112 is any device that emits radio frequency energy that interferes with the ability to acquire accurate information from signals received by the GNSS receiver 110 from a GNSS satellite 114. For example, an interfering signals source 112 may produce a signal with RF power that is evenly distributed in the L1 band, thus preventing the ability to acquire accurate information from signals in the L1 band. In certain circumstances, the interfering signal source 112 may generate a swept FM source where the chirp rate is 8 kHz to 170 kHz that is modeled as white noise. The generated FM signal also prevents the ability to acquire accurate information from received signals.

In at least one embodiment, to monitor for broadband RFI, the RFI monitor 102 includes a processing unit 104 and a memory unit 106. For example, processing unit 104 is a programmable device that processes signals received from the GNSS receivers 110 as instructed by instructions stored on the memory unit 106.

The memory unit 106 is an electronic hardware device for storing machine readable data and instructions. In one embodiment, memory unit 120 stores information on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), Ferroelectric RAM (FRAM), and flash memory, etc. Suitable processor-readable media may also include transmission media such as electrical, electromagnetic, or digital signals, conveyed via a communication medium such as a network and/or a wireless link.

In certain embodiments, to monitor signals received at the GNSS receiver 110 for broadband RFI, memory unit 106 includes statistics instructions 120, broadband RFI monitoring instructions 130, and readmittance instructions 140. As described herein, the statistics instructions 120 instruct processing unit 104 to calculate statistics that are used to determine whether or not broadband RFI is interfering with the reception of signals from the GNSS satellites 114. For example, upon execution of the statistics instructions 120, the processing unit 104 calculates a smoothed C/N0, a jammer power to noise value for the GNSS Receiver 110, and an instantaneous C/N0 for each satellite 114 tracked by the GNSS receiver 110.

Further, the broadband RFI monitoring instructions 130 direct the processing unit 104 to use the calculated statistics to monitor each satellite 114 for the presence of broadband RFI. For example, the processing unit 104, upon execution of the broadband RFI monitoring instructions 130 compares the smoothed C/N0 against the present C/N0 value to determine if broadband RFI is present at the GNSS receiver 110. In the case where excessive broadband RFI is present, the processing unit 104 alters how the measurements from a GNSS receiver 110 are used in the calculation of global positioning data. For example, the processing unit 104 excludes measurements from satellites 114 when the broadband RFI substantially affects the ability to acquire information in the signals from the satellites 114. When measurements from a satellite 114 are excluded, the measurements are not used in making calculations based on signals received from the satellite 114.

In at least one embodiment, when measurements from a satellite have been excluded, the processing unit 104 executes readmittance instructions 140 to determine whether measurements from an excluded satellite are able to be readmitted, where a readmitted measurement is used in calculations based on signals from the satellites 114. For example, the information in the signals can be used to calculate global positioning data, such as pseudorange corrections and navigation information for vehicles. The system 100 does not use signals from excluded satellites when making these corrections. In at least one embodiment, to readmit information from a satellite, the RFI monitor 102 continues to monitor the signals from the excluded satellites and compares measurements in the signals against a readmittance threshold and determines whether readmitting the signal will improve the overall performance of the system 100.

Figure 2:
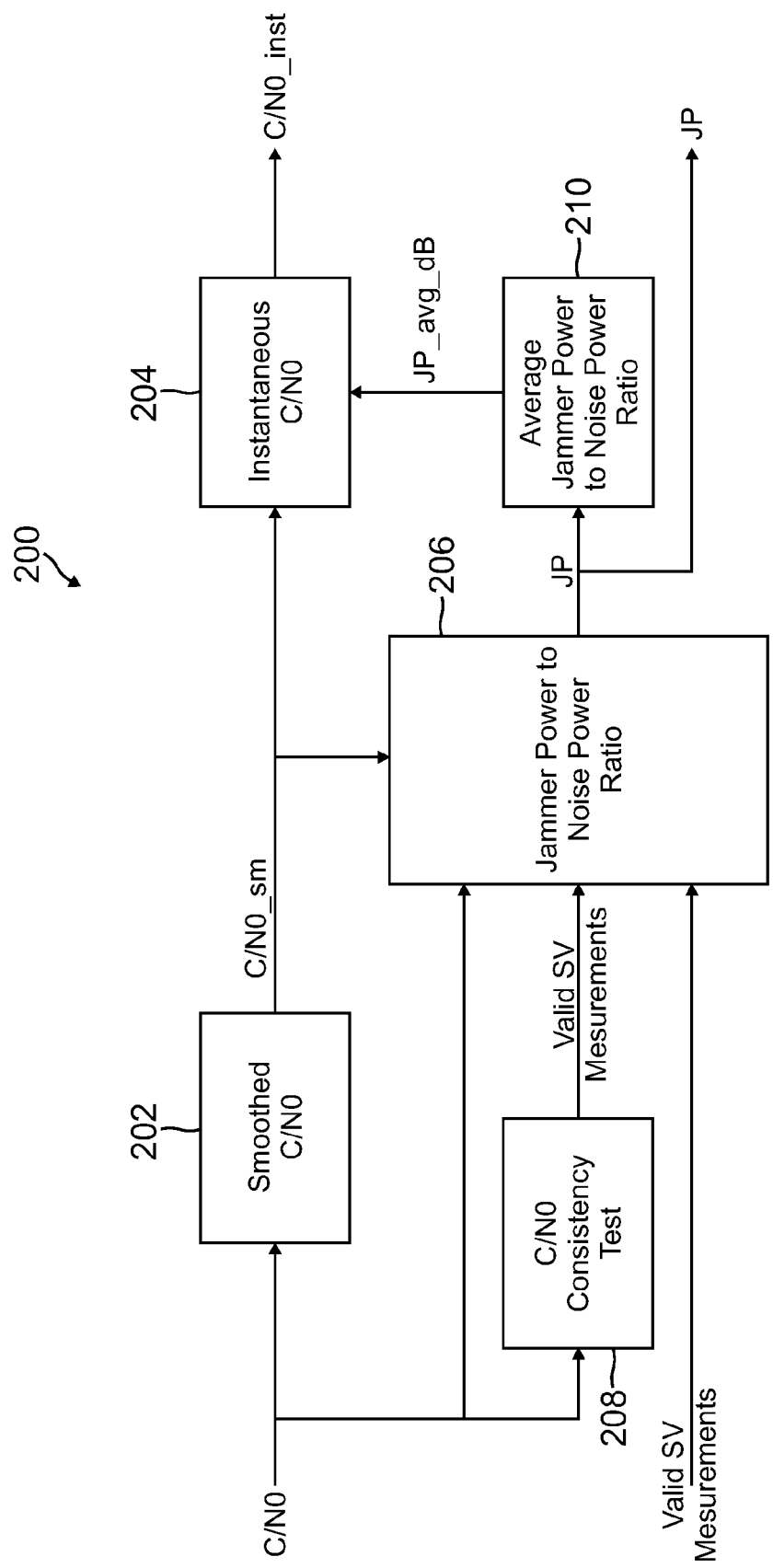
FIG. 2 is a flow diagram illustrating the calculation of test statistics in one embodiment described in the present disclosure.
Figure 3:
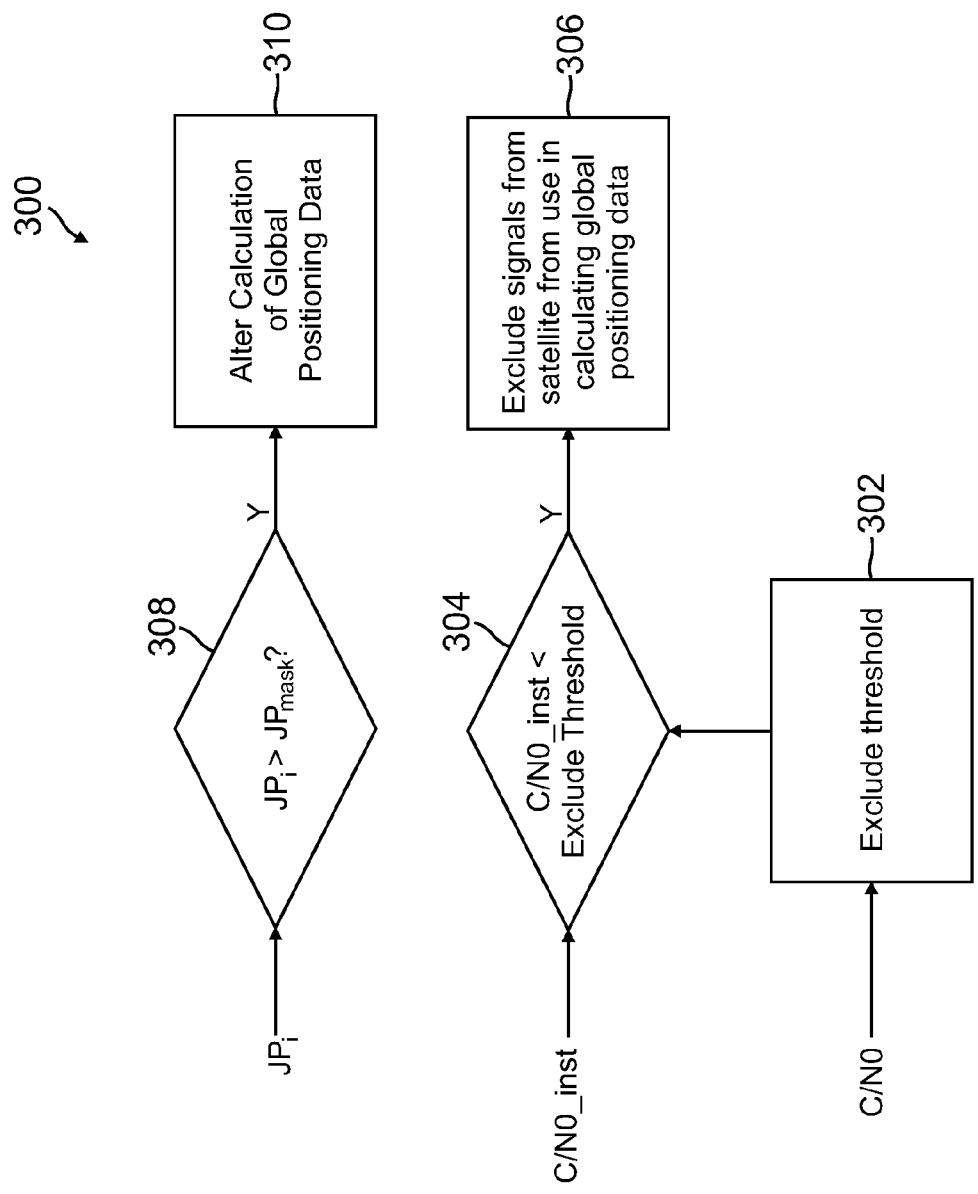
FIG. 3 is a flow diagram illustrating the monitoring of test statistics in one embodiment described in the present disclosure.
Figure 4:
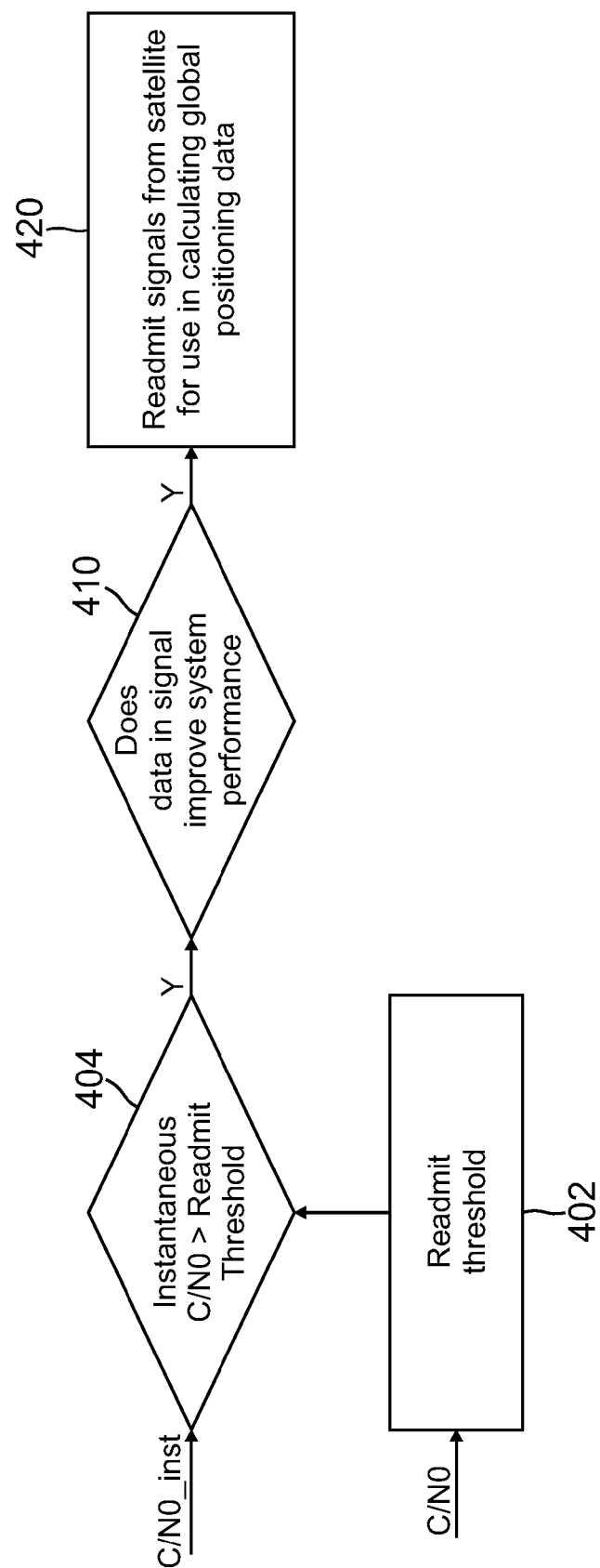
FIG. 4 is a flow diagram illustrating the readmittance of satellite measurements in calculations in one embodiment described in the present disclosure.

FIGS. 2-4 illustrate exemplary embodiments of the execution of instructions stored in memory unit 106. For example, FIG. 2 is a flow diagram illustrating a statistics calculation algorithm 200 for calculating test statistics. Processing unit 104 performs statistics calculation algorithm 200 upon the execution of statistics instructions 120. As illustrated in FIG. 2, in calculating the test statistics, the statistics calculation algorithm 200 receives two inputs. A first input is a carrier to noise value (C/N0) that is provided for each signal from a satellite 114 that is received by a receiver 110. When there are multiple receivers 110, the statistics calculation algorithm 200 receives a different C/N0 for each satellite 114 through each GNSS receiver 110. For example, when there are four receivers 110 receiving a signal from the same satellite 114, the statistics calculation algorithm 200 receives four different C/N0 values for each signal from a satellite 114 that is received by one of the receivers 114. In certain embodiments, the statistics calculation algorithm 200 is provided a C/N0 value associated with a particular satellite 114 and receiver 110 every 0.5 seconds. The second input is a designation that the measurement for the particular satellite 114 and GNSS receiver 110 is valid satellite vehicle (SV) measurement and may be used in the calculation of jammer power to noise power value.

Upon receiving the two inputs, the statistics calculation algorithm proceeds to 202, where a smoothed C/N0 is calculated. To facilitate determinations as to whether broadband RFI is present at a GNSS receiver 110, the statistics calculation algorithm 202 determines the smoothed C/N0 level for each signal from a particular satellite 114 on each receiver 110. The smoothed C/N0 level provides a reference to determine if present C/N0 measurements are substantially affected by broadband RFI. In at least one exemplary implementation, the smoothed C/N0 is defined by a filtered value that uses a 100 second time constant. As one having skill in the art can appreciate, in at least one implementation, the smoothed C/N0 value is calculated based on half second C/N0 values acquired from a GNSS receiver 110 where the C/N0 values are averaged over the time period, or smoothed according to mathematical methods that remove outlying C/N0 measurements. In at least one embodiment, the smoothed C/N0 is calculated according to the following equations:

For j=1 to $N_j$ and i=1 to M:

$$(C/N_{0\_sm})_{i,j}(k) = (C/N_0)_{i,j}(k) \quad (k=0)$$

$$(C/N_{0\_sm})_{i,j}(k) = (C/N_{0\_sm})_{i,j}(k-1) - \frac{T}{\tau}\left((C/N_{0\_sm})_{i,j}(k-1) - (C/N_0)_{i,j}(k)\right) \quad (k \neq 0)$$

where C/N0(k) is a present carrier to noise measurement;
$N_j$ is the number of valid satellite measurements from a receiver 110 which can be used in the calculation of a jammer power to noise power value;
M is the number of receivers 110;
k is the current sample;
k−1 is the previous sample;
T is a period between carrier to noise measurements; and
τ is the period of time over which the carrier to noise measurements are used to calculate the smoothed carrier to noise value.

In other equations described below, the above definitions of variables and any subsequent definitions of variables apply throughout this description.

For each satellite 114 communicating with a GNSS receiver 110 at start-up and following a reset, the statistics calculation algorithm 200 waits for the C/N0 to converge before the smoothed C/N0 may be used to ensure that the smoothed C/N0 is based on valid measurements acquired during a specific time period. In certain implementations, the C/N0 measurements are valid if they satisfy certain conditions. A valid C/N0 measurement may be a measurement with a C/N0 level above a certain threshold. Further, the threshold can change before and after the C/N0 measurements converge. For example, a valid C/N0 level can be a measurement having a value above 33.4 dB-Hz if the measurements have not converged or a measurement having a value above 23.0 dB-Hz if the measurements have converged. After the C/N0 measurements converge, if two consecutive C/N0 measurements are deemed invalid, the receiver 110 is reset and the statistics calculation algorithm 200 again waits for C/N0 measurements to converge before using the C/N0 measurements to calculate the smoothed average. In at least one exemplary implementation, the C/N0 measurements converge when valid C/N0 measurements are acquired over two consecutive defined time constants for the smoothed C/N0. For example, when the smoothed C/N0 is calculated using a 100 second time constant, the C/N0 measurements converge when valid C/N0 measurements are received over two consecutive time constants or a period of 200 seconds.

Further, upon receiving the two inputs (the C/N0 and validity indication) the statistics calculation algorithm 200 proceeds to 208, where the statistics calculation algorithm 200 performs a C/N0 consistency test. Because broadband RFI affects the receiver 110, the broadband RFI affects the C/N0 of each signal received at the receiver 110 for all satellites 114. Therefore, because broadband RFI affects all the satellite signals received at a receiver 110, the C/N0 consistency test identifies drops in C/N0 measurement data that are consistent across all the tracked satellite signals received at a GNSS receiver 110 to determine that the drop is due to broadband RFI. The consistency test ensures that subsequent calculations are not adversely affected by decreased C/N0 measurement data that is not due to broadband RFI.

In certain implementations, the consistency test computes the drops in C/N0 measurements by comparing a drop in C/N0 against an average drop for a receiver 110. To calculate the average drop, the statistics calculation algorithm 200 calculates the average difference between a smoothed C/N0 and the present C/N0 measurement received from the receiver 110 for all satellites 114 that provide signals received by the receiver 110. The calculated drop in the C/N0 for each signal received by the receiver 110 from a satellite 114 is then compared against the average drop for the signals received from all the satellites 114 by the receiver 110. If the current C/N0 measurement deviates from the average difference by more than a threshold deviation, then the current C/N0 measurement will not be used in subsequent calculations. In at least one example, the current C/N0 measurement is not used in subsequent calculations when the current C/N0 measurement deviates from the average difference by more than 3 dB-Hz. In certain implementations, when a C/N0 measurement for a signal from a particular satellite is removed, the average difference is recomputed from the remaining C/N0 measurements, and all remaining C/N0 measurements are tested again. In some implementations, the statistics calculation algorithm 200 repeats the consistency test until there are no C/N0 measurements that have a drop that differs from the average difference by more than the threshold deviation.

In certain embodiments, the consistency test is performed according to the following equations where $Q_i = N_i$. The value $Q_i$ is equal to the number of valid satellite measurements for a particular iteration of consistency tests on receiver 110. First, the average drop of the C/N0 measurements is computed for each receiver 110 according to the following:

$$(C/N_{0\_drop\_ave})_i(k) = \frac{1}{Q_i} \sum_{j=1}^{Q_i} \left((C/N_{0\_sm})_{i,j}(k) - (C/N_0)_{i,j}(k)\right).$$

Second, the deviation from the average drop in C/N0 measurements is determined for the satellite 114 that has the largest drop in a C/N0 measurement for each receiver 110 using the following equation:

$$(C/N_{0\_dev\_max})_i(k) = \text{MAX}\left\{\frac{\left((C/N_{0\_sm})_{i,j}(k) - (C/N_0)_{i,j}(k)\right) - (C/n_{0\_drop\_ave})_i(k)}{Q_i - 1} \times Q_i\right\}.$$

The above equation determines the maximum deviation from the average drop for C/N0 measurements, where the contribution of each satellite 114 to the overall average has been removed. A resultant positive number identifies a drop in C/N0 measurements that is larger than the average drop. Therefore, the satellite with the largest positive value determines the satellite with the maximum deviation. A negative value indicates a smaller than average drop. Third, the largest deviation calculated for a receiver 110 is compared against a threshold and responds to the threshold comparison according to the following equations:

If $(C/N_{0\_dev\_max})_i(k) > C/N_{0\_dev\_thresh}$ then remove the satellite C/N0 measurement data which had the largest deviation;
re-test remaining C/N0 measurements for a Receiver i for consistency;

$Q_i = Q_i - 1$

When the smoothed C/N0 value is determined and the C/N0 measurements have been validated by the C/N0 consistency test, the statistics calculation algorithm 200 proceeds to 206 where the statistics calculation algorithm 200 calculates the jammer power to noise power value. In certain embodiments, the jammer power to noise power value is computed for each GNSS receiver 110 using signals for all satellites 114 currently being received by the receiver 110, where the signals satisfy a particular set of conditions. For example, in one implementation, the set of conditions entails that C/N0 measurements have converged, C/N0 measurements are valid, a satellite 114 is within the reception mask of a GNSS receiver 110, the C/N0 measurement is not excluded, and the C/N0 measurement has not been removed by the performance of a consistency test. When signals from the tracked satellites 114 satisfy the delineated conditions, the statistics calculation algorithm 200 computes the jammer power to noise power value for each GNSS receiver 110 by calculating the average drop in C/N0 for all valid satellite measurements, where the drop is defined to be the difference between the average smoothed C/N0 and present C/N0 values. In at least one implementation, the jammer power to noise power value $JP_i(k)$ is calculated according to the following equation:

For i=1 to M:

$$JP_i(k) = \frac{\sum_{j=1}^{Q_i} 10^{\left(\frac{(c/N_{0\_sm})_{i,j}(k)-(c/N_0)_{i,j}(k)}{10}\right)}}{Q_i} - 1,$$

where k is the current measurement period.

When the jammer power to noise power value for the GNSS receiver 110 is calculated, the statistics calculation algorithm 200 proceeds to 210 to calculate the average jammer power to noise power value. In at least one implementation, the statistics calculation algorithm 200 calculates the average jammer power to noise power value by averaging the last three jammer power to noise power value measurements. The statistics calculation algorithm 200 calculates the individual jammer power to noise power value measurement by computing the average difference between smoothed C/N0 and the present C/N0 for every signal received by the GNSS receiver 110 using all satellites 114 that has been validated.

In at least one implementation, the statistics calculation algorithm 200 calculates the average jammer power to noise power value according to the following equations:

Eq 1

For i = 1 to M
  K = 1
  If (time of $JP_i(k)$ less the time of $JP_i(k-2)$ <= 1.0 seconds)
    K = 3
  Else If (time of $JP_i(k)$ less the time of $JP_i(k-1)$ <= 1.0 seconds)
    K = 2

$$JP\_avg_i(k) = \frac{\sum_{kk=0}^{K-1} JP_i(k-kk)}{K}$$

$JP\_avg\_dB_i(k) = 10 \times \log(JP\_avg_i(k) + 1)$
where: K is the number of measurements;
    k denotes the current measurement period;
    k-1 denotes the previous measurement period; and
    k-2 denotes the previous previous measurement period.
If $JP\_avg\_dB_i(k)$ has not been calculated, the instantaneous $C/N_0$ calculation is not performed. If $JP_i$ is non-zero, then $Q_i$ is non-zero.

Further, when the smoothed C/N0 and the average jammer power to noise power value are calculated, the statistics calculation algorithm 200 proceeds to 204, where an instantaneous C/N0 is calculated. The statistics calculation algorithm 200 calculates the instantaneous C/N0 for each tracked satellite 114 on each GNSS receiver 110 as the difference between the smoothed C/N0 and the average jammer power to noise power value. When the instantaneous C/N0 is calculated, the statistics calculation algorithm 200 provides the instantaneous C/N0 and the jammer power to noise power value as outputs for subsequent processing for detecting broadband RFI. In certain implementations, the statistics calculation algorithm 200 calculates the instantaneous C/N0 according to the following equation:

For j=1 to $P_i$ and i=1 to M $(C/N_{0\_inst})_{i,j}(k) = (C/N_{0\_sm})_{i,j}(k) - JP\_avg\_dB_i(k)$ FIG. 3 is a flow diagram illustrating a broadband RFI detection algorithm 300 for detecting broadband RFI. Processing unit 104 performs broadband RFI detection algorithm 300 upon the execution of broadband RFI monitoring instructions 130. The broadband RFI detection algorithm 300 detects broadband RFI based on two inputs. The two inputs include an instantaneous C/N0 where the instantaneous C/N0 is calculated by the statistics calculation algorithm 200 described in FIG. 2 and the C/N0 measurement acquired from the GNSS receiver 110. The broadband RFI detection algorithm 300 proceeds to 302 by using the C/N0 measurement to calculate an exclude threshold. In certain implementations, the calculation of the exclude threshold is dependent on the overall variance of the C/N0 measurements received from the GNSS receiver 110 from each satellite. For example, in certain embodiments, the broadband RFI detection algorithm 300 calculates the exclude threshold using the variance of all C/N0 measurements that were used to calculate the Jammer power to noise power value for the GNSS receiver 110, which is attributable to broadband RFI. Further, the broadband RFI detection algorithm may calculate the variance in the C/N0 that is not attributable to broadband RFI. In certain implementations, the broadband RFI detection algorithm 300 calculates the exclude threshold according to the following equation:

$$\text{Min\_Power}_i = 32 + k_{md} \times \sqrt{(\sigma_{cip,i})^2 + \frac{(\sigma_{other})^2}{Q_i}};$$

where $k_{md}$ is a missed detection multiplier;
    $\sigma_{other}^2$ is the C/N0 variance due to causes other than broadband RFI;
    $Q_i$ is the number of valid measurements for a receiver i; and
    $\sigma_{cip,i}^2$ is the current overall broadband C/N0 variance for a receiver i.

When the exclude threshold is calculated, the broadband RFI detection algorithm 300 proceeds to 304 to determine whether the instantaneous C/N0 is below the exclude threshold. If the instantaneous C/N0 is below the exclude threshold, the broadband RFI detection algorithm 300 proceeds to 306 and removes the satellite measurement from the calculation of global positioning data. For example, the broadband RFI detection algorithm 300 excludes the measurements from a GNSS satellite 114 associated with the instantaneous C/N0 measurement such that measurements from the excluded GNSS satellite 114 are not used in the calculation of certain parameters based on the measurements from the GNSS satellites 114. For example, measurements from an excluded GNSS satellite 114 are not used to formulate pseudorange corrections. Conversely, if the instantaneous C/N0 is above the exclude threshold and the measurement is not presently excluded, the measurements from a GNSS satellite 114 are used in the calculation of global positioning data based on the measurements from the GNSS satellites 114. In certain implementations, the broadband RFI detection algorithm 300 compares the instantaneous C/N0 against the exclude threshold according to the following equation:

$$(C/N_{0\_inst})_{i,j}(k) < \text{Min\_Power}_i.$$

When a GNSS satellite 114 is excluded, the C/N0 measurements received from the excluded GNSS satellite 114 are still processed by the statistics calculation algorithm 200 in FIG. 2 to provide a smoothed C/N0 and an instantaneous C/N0. The instantaneous C/N0 is monitored to determine whether measurements from an excluded satellite can be readmitted into calculation of global positioning data 420.

In at least one embodiment, the broadband RFI detection algorithm 300 proceeds to 308, where the jammer power to noise power value calculated by the statistics calculation algorithm 200 in FIG. 2 is compared against a jammer power mask. The jammer power mask is a spectrum level that defines regulatory and performance limits for RF interference. Further, the mask define the amount of excessive radiation at a given frequency and bandwidth, and the level of interference that can be experienced by the GNSS receiver in the particular environment. If the jammer power to noise power value is above the jammer power mask, the broadband RFI detection algorithm 300 proceeds to 310 where the calculation of global positioning data is altered. For example, in at least one embodiment, when the jammer power to noise power value is below the jammer power mask, a SDM receiver bias method is allowed in the calculation of global positioning data. Conversely, when the jammer power to noise power value exceeds the jammer power mask, the SDM receiver bias method is not allowed in the calculation of global positioning data. By altering the calculations of global positioning data, the present application describes a system that can safely operate in environments where the broadband RFI exceeds the jammer power mask. In at least one exemplary implementation, the broadband RFI detection algorithm 300 compares the jammer power to noise power value to a jammer mask according to the following equations:

If $JP_i > JP_{mask}$ then
$BBN_i$ = TRUE
Endif where: $BBN_i$ is a value that identifies the presence of a level of broadband RFI coincident with allowable operation of the SDM instantaneous receiver bias.

FIG. 4 is a flow diagram illustrating a readmittance algorithm 400 that monitors the smoothed C/N0 and the instantaneous C/N0 from excluded satellites to determine when the measurements can be readmitted for performing calculations based on GNSS satellite measurements. Processing unit 104 in FIG. 1 performs readmittance algorithm 300 upon the execution of readmittance instructions 140. Similar to the broadband RFI detection algorithm 300, the readmittance algorithm 400 receives both the instantaneous C/N0 calculated by the statistics calculation algorithm 200 and the C/N0 measurement acquired from the GNSS receiver 110.

In at least one embodiment, the readmittance algorithm 400 proceeds to 402, wherein a readmit threshold is calculated based on the C/N0 measurement from the excluded satellite 114. For example, the readmit threshold is calculated based on the overall variance of all C/N0 measurements received from the GNSS receiver 110. In some implementations, the readmit threshold and the exclude threshold are calculated using similar inputs. When the readmit threshold is calculated, the readmittance algorithm 400 proceeds to 404 where the instantaneous C/N0 is compared against the calculated readmit threshold. In at least one implementation, if the instantaneous C/N0 is lower than the readmit threshold, measurements from the GNSS satellite 114 received by the associated GNSS receiver 110 will continue to be excluded. However, when the instantaneous C/N0 exceeds the readmit threshold, the readmittance algorithm 400 performs specific readmittance checks before using the measurement in the calculation of global positioning data. In certain implementations, the readmittance algorithm 400 calculates the readmittance threshold according to the following equation:

$$\text{Min\_RA\_Power}_i = 32 + k_{ra} \times \sqrt{(\sigma_{cip,i})^2 + \frac{(\sigma_{other})^2}{Q_i}};$$

where: $k_{ra}$ is the false readmittance multiplier;
$\sigma_{other}^2$ is the C/N0 variance due to causes other than broadband RFI;
$Q_i$ is the number of valid measurements for a receiver i; and
$\sigma_{cip,i}^2$ is the current overall broadband C/N0 variance for the receiver i.

In certain embodiments, when the instantaneous C/N0 exceeds the readmit threshold, the readmittance algorithm 400 proceeds to 410 where, the readmittance algorithm 400 determines whether readmittance of signals from a particular GNSS satellite 114 through a GNSS receiver 110 will improve the performance of calculating global positioning data. For example, if the error associated with the calculation of global positioning data decreases, then the readmittance algorithm 400 determines that the readmittance of the signal will improve the system performance. When the readmittance algorithm 400 determines that a signal from a particular satellite improves system performance, the readmittance algorithm 400 proceeds to 420, where signals from a satellite 114 are readmitted for use in calculating global positioning data. When a satellite 114 is readmitted through a receiver 110, the receiver 110 continues to be monitored by the execution of the broadband RFI detection algorithm 300 described in FIG. 3 for the detection of broadband RFI. In certain implementations, the readmittance algorithm 400 compares the instantaneous C/N0 against the readmittance threshold according to the following equation:

$$(C/N_{0\_inst})_{i,j}(k) \geq \text{Min\_RA\_Power}_i.$$

Figure 5:
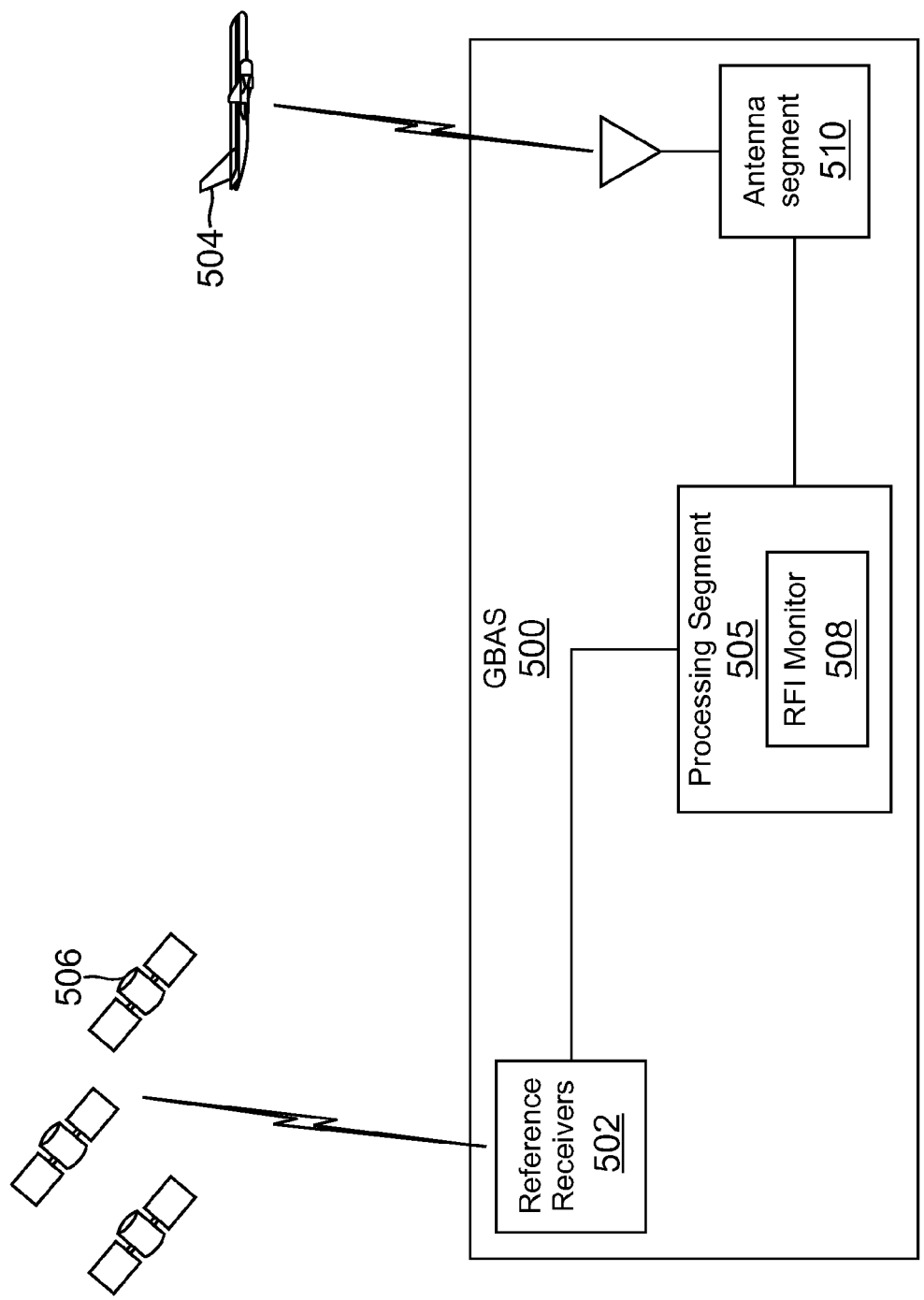
FIG. 5 is a block diagram of a ground-based augmentation system that monitors broadband radio frequency interference in one embodiment described in the present disclosure.

FIG. 5 is a block diagram illustrating a ground based augmentation system (GBAS) 500. GBAS 500 is a system that receives and measures signals from GNSS satellites 506 and broadcasts data to aircraft 504. GBAS 500 includes a processing segment 505 that provides pseudorange correction and approach guidance to an aircraft 504. To provide the pseudorange corrections and approach guidance, the processing segment 505 receives and processes GNSS signals received by multiple reference receivers 502 that have accurately known reference points. Further, the Processing segment 505 generates pseudorange corrections measurements and monitors for threats to the integrity of the pseudorange corrections. Further, the processing segment 505 provides the flight path information and dynamic pseudorange corrections to an antenna segment 510 for transmission to aircraft 504. When the processing segment 505 receives and process GNSS signals, the GBAS 500 receives the GNSS signals through the reference receivers 502, where the reference receivers 502 include one or more GNSS receivers that communicate with GNSS satellites 506. The GBAS 500 calculates the pseudorange corrections and stores approach data using processing segment 505, then transmits the corrections and approach data to the aircraft 504 through the antenna segment 510. In at least one embodiment, the processing segment 505 resides as part of the reference receivers 502.

To aid in the monitoring for threats to the integrity of the pseudorange corrections, the processing segment 505 includes an RFI monitor 508. The RFI monitor 508 monitors the environment of the reference receivers 502 for broadband RFI. When the RFI monitor 508 determines that a signal from a GNSS satellite 506 through a reference receiver 502 is affected by broadband RFI, the RFI monitor 508 excludes measurements from the GNSS satellite 506 through the reference receiver 502 when calculating pseudorange corrections. While the measurements are excluded, the RFI monitor 508 continues to monitor the level of broadband RFI, when the broadband RFI levels become acceptable, the RFI monitor 508 performs tests to determine if the measurements from the GNSS satellite 506 can again be used in the calculation of pseudorange data as described in relation to the readmittance algorithm 400 in FIG. 4.

Figure 6:
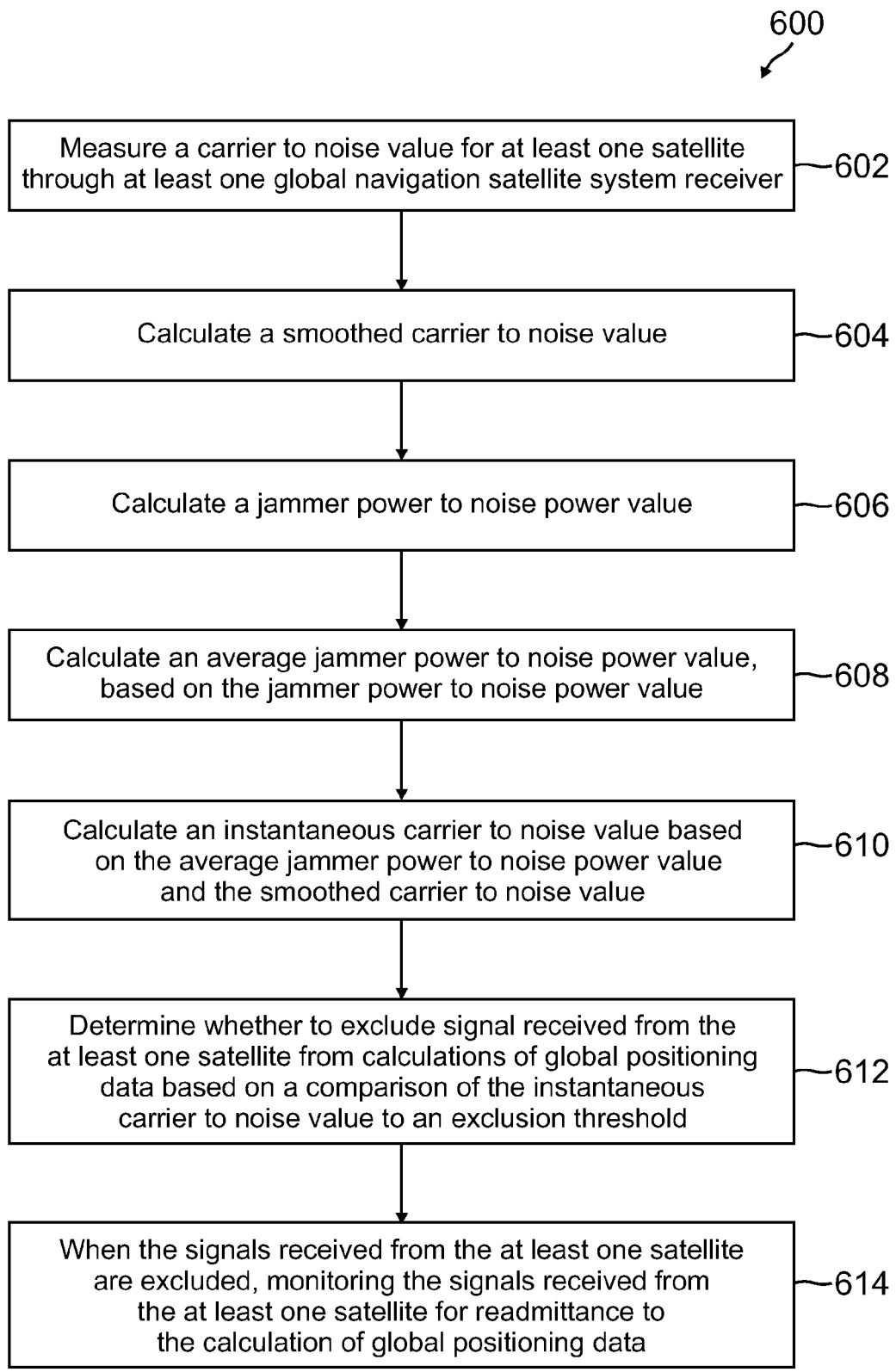
FIG. 6 is a flow diagram of a method for monitoring broadband radio frequency interference in one embodiment described in the present disclosure.

FIG. 6 is a flow diagram of a method 600 for monitoring broadband radio frequency interference. The method 600 proceeds at 602, where a carrier to noise value is measured for at least one satellite through at least one global navigation satellite system receiver. The method 600 proceeds at 604 where a smoothed carrier to noise value is calculated. For example, when there are multiple receivers, a processing unit receives a separate carrier to noise value from each satellite through each receiver. The processing unit then calculates a smoothed carrier to noise value. The method 600 proceeds to 606, where a jammer power to noise power value is calculated. For example, in certain implementations, the jammer power to noise power value is calculated based on the average drop in carrier to noise values for all satellite signals received by a GNSS receiver. The method 600 proceeds to 608 where an average jammer power to noise power value is calculated based on the jammer power to noise power value.

The method 600 proceeds to 610, where an instantaneous carrier to noise value is calculated based on the average jammer power to noise power value and the smoothed carrier to noise value. Further, the method 600 proceeds to 612, where it is determined whether to exclude signals from calculations of global positioning data based on a comparison of the instantaneous carrier to noise value to an exclusion threshold. For example, when the instantaneous carrier to noise value is lower than the exclude threshold, the signals from the satellite associated with the instantaneous carrier to noise value are excluded from calculations, when the signal is received through the receiver associated with the instantaneous carrier to noise value. The method 600 proceeds to 614, where, when the signals received from the at least one satellite are excluded, the signals are monitored for readmittance to the calculation of global positioning data. For example, if the instantaneous carrier to noise value is greater than the readmittance threshold, the signals from the satellite associated with the instantaneous carrier to noise value are re-introduced into the calculation of global positioning data.

EXAMPLE EMBODIMENTS

Example 1 includes a system for monitoring broadband radio frequency interference, the system comprising: at least one global navigation satellite system receiver configured to receive signals from at least one satellite and provide measurements from the at least one satellite, wherein the measurements are used to calculate global positioning data; at least one memory unit configured to store instructions and data; and a processing unit coupled to the at least one global navigation satellite system receiver and the at least one memory unit, where the instructions direct the processing unit to: measure a carrier to noise value for the at least one satellite through the at least one global navigation satellite system receiver; calculate a smoothed carrier to noise value, wherein the smoothed carrier to noise value is calculated based on measurements from the at least one global navigation satellite system receiver during a first time period; calculate a jammer power to noise power value; calculate an average jammer power to noise power value, based on the jammer power to noise power value; calculate an instantaneous carrier to noise value based on the average jammer power to noise power value and the smoothed carrier to noise value; calculate an exclusion threshold value; compare the instantaneous carrier to noise value to the exclusion threshold value; and alter how the measurements are used to provide global positioning data based on the comparison.

Example 2 includes the system of Example 1, wherein the at least one global navigation satellite system receiver is a reference receiver in a ground based augmentation system and the measurements are used to provide pseudorange corrections and flight path approach guidance to aircraft.

Example 3 includes the system of any of Examples 1-2, wherein the first time period is 200 seconds.

Example 4 includes the system of any of Examples 1-3, wherein the processing unit determines that the carrier to noise value has converged before the processing unit calculates the smoothed carrier to noise value.

Example 5 includes the system of any of Examples 1-4, wherein the processing unit determines that drops in carrier to noise values are consistent for the signals received by the at least one global navigation satellite system receiver.

Example 6 includes the system of Example 5, wherein the drops in carrier to noise value for the signals received which are not consistent for the signals received by the at least one global navigation satellite system receiver are not used in the calculation of the jammer power to noise power value or the average power to noise power value.

Example 7 includes the system of any of Examples 1-6, wherein the processing unit alters how the measurements are used by excluding measurements from the at least one satellite from being used in calculations to provide global positioning data.

Example 8 includes the system of Example 7, wherein the processing unit further monitors measurements from the at least one satellite for readmittance into calculations to provide global positioning data when the measurements from the at least one satellite are excluded.

Example 9 includes the system of any of Examples 1-8, wherein the global positioning data include pseudorange corrections.

Example 10 includes the system of any of Examples 1-9, wherein the processing unit is further configured to: compare the jammer power to noise power value against a jammer mask; and alter the calculation of the global positioning data based on the comparison of the jammer power to noise power value and the jammer mask, wherein the jammer power mask is a power spectral density level that defines regulatory and performance limits for radio frequency interference.

Example 11 includes the system of Example, wherein at least one global navigation satellite system receiver contains the processing unit and the memory unit.

Example 12 includes a method for monitoring broadband radio frequency interference, the method comprising: measuring a carrier to noise value for at least one satellite through at least one global navigation satellite system receiver; calculating a smoothed carrier to noise value, wherein the smoothed carrier to noise value is calculated based on measurements from the at least one global navigation satellite system receiver during a first time period; calculating a jammer power to noise power value; calculating an average jammer power to noise power value, based on the jammer power to noise power value; calculating an instantaneous carrier to noise value based on the average jammer power to noise power value and the smoothed carrier to noise value; determining whether to exclude signals received from the at least one satellite from calculations of global positioning data based on a comparison of the instantaneous carrier to noise value to an exclusion threshold; and when the signals received from the at least one satellite are excluded, monitoring the signals received from the at least one satellite for readmittance to the calculation of global positioning data.

Example 13 includes the method of Example 12, wherein determining whether to exclude the signals comprises: calculating the exclusion threshold based on the variance of carrier to noise values; and comparing the instantaneous carrier to noise value against the exclusion threshold.

Example 14 includes the method of any of Examples 12-13, wherein monitoring the signals for readmittance comprises: calculating a readmittance threshold based on the variance of carrier to noise values; comparing the instantaneous carrier to noise value against the readmittance threshold; determining whether readmitting the signals improves the calculation of global positioning data; and readmitting the signals if the instantaneous carrier to noise value exceeds the readmittance threshold and the received signal improves the performance of global positioning data.

Example 15 includes the method of Example 14, wherein determining that readmitting the signals improves the calculation of global positioning data comprises determining whether an error in a pseudorange decreases when the signals are readmitted.

Example 16 includes the method of any of Examples 12-15, further comprising verifying that the signals associated with the at least one satellite are consistent for a single receiver.

Example 17 includes the method of any of Examples 12-16, wherein calculating a smoothed carrier to noise value comprises waiting for carrier to noise values from the at least one receiver to converge before using the smoothed carrier to noise value.

Example 18 includes the method of any of Examples 12-17, further comprising determining whether to alter the calculations of global positioning data based on the comparison of the average jammer power to noise power value and a pre-defined jammer power mask, wherein the jammer power mask is a power spectral density level that defines regulatory and performance limits for radio frequency interference.

Example 19 includes a program product for monitoring broadband radio frequency interference, the program product comprising a plurality of instructions tangibly stored on a non-transitory storage medium, the instructions operable when executed, to cause a processing unit to: calculate a set of statistics based on at least one received signal associated with at least one receiver and at least one satellite, wherein the set of statistics include a smoothed carrier to noise value and an instantaneous carrier to noise value for the at least one received signal; detect broadband radio frequency interference by comparing the smoothed carrier to noise value to the present carrier to noise value, and computing a jammer power to noise power value based on an average difference between the smoothed carrier to noise value and a present carrier to noise value, and then computing an instantaneous carrier to noise value from the smoothed carrier to noise value and a jammer power to noise power value, wherein the at least one received signal is excluded from calculation of global positioning data based on the comparison of the instantaneous carrier to noise value to an exclusion threshold; and when the at least one received signal is excluded, monitor the at least one received signal for readmittance to the calculation of global positioning data.

Example 20 includes the program product of Example 19, wherein the the plurality of instructions cause a processing unit to: calculate the exclusion threshold based on the variance of carrier to noise values; and compare the instantaneous carrier to noise value against the exclusion threshold.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A system for monitoring broadband radio frequency interference, the system comprising:
    at least one global navigation satellite system receiver configured to receive signals from at least one satellite and provide measurements from the at least one satellite, wherein the measurements are used to calculate global positioning data;
    at least one memory unit configured to store instructions and data; and
    a processing unit coupled to the at least one global navigation satellite system receiver and the at least one memory unit, where the instructions direct the processing unit to:
        measure a carrier to noise value for the at least one satellite through the at least one global navigation satellite system receiver;
        calculate a smoothed carrier to noise value, wherein the smoothed carrier to noise value is calculated based on measurements from the at least one global navigation satellite system receiver during a first time period;
        calculate a jammer power to noise power value, wherein the jammer power to noise power value comprises the average drop in the carrier to noise value for valid satellite measurements, where the drop comprises a difference between the smoothed carrier to noise values and a present carrier to noise value;
        calculate an average jammer power to noise power value, based on the jammer power to noise power value;
        calculate an instantaneous carrier to noise value based on the average jammer power to noise power value and the smoothed carrier to noise value;
        calculate an exclusion threshold value based on the variance of the carrier to noise values from the at least one global navigation satellite system receiver;
        compare the instantaneous carrier to noise value to the exclusion threshold value; and
        when the instantaneous carrier to noise value is below the exclusion threshold value, exclude the measurements from the calculation of global positioning data.

2. The system of claim 1, wherein the at least one global navigation satellite system receiver is a reference receiver in a ground based augmentation system and the measurements are used to provide pseudorange corrections and flight path approach guidance to aircraft.

3. The system of claim 1, wherein the first time period is 200 seconds.

4. The system of claim 1, wherein the processing unit determines that the carrier to noise value has converged before the processing unit calculates the smoothed carrier to noise value.

5. The system of claim 1, wherein the processing unit determines that drops in carrier to noise values are consistent for the signals received by the at least one global navigation satellite system receiver.

6. The system of claim 5, wherein the drops in carrier to noise value for the signals received which are not consistent for the signals received by the at least one global navigation satellite system receiver are not used in the calculation of the jammer power to noise power value or the average power to noise power value.

7. The system of claim 1, wherein the processing unit alters how the measurements are used by excluding measurements from the at least one satellite from being used in calculations to provide global positioning data.

8. The system of claim 7, wherein the processing unit further monitors measurements from the at least one satellite for readmittance into calculations to provide global positioning data when the measurements from the at least one satellite are excluded.

9. The system of claim 1, wherein the global positioning data include pseudorange corrections.

10. The system of claim 1, wherein the processing unit is further configured to:
compare the jammer power to noise power value against a jammer mask; and
alter the calculation of the global positioning data based on the comparison of the jammer power to noise power value and the jammer mask, wherein the jammer power mask is a power spectral density level that defines regulatory and performance limits for radio frequency interference.

11. The system of claim 1, wherein at least one global navigation satellite system receiver contains the processing unit and the memory unit.

12. A method for monitoring broadband radio frequency interference, the method comprising:
measuring a carrier to noise value for at least one satellite through at least one global navigation satellite system receiver;
calculating a smoothed carrier to noise value, wherein the smoothed carrier to noise value is calculated based on measurements from the at least one global navigation satellite system receiver during a first time period;
calculating a jammer power to noise power value, wherein the jammer power to noise power value comprises the average drop in the carrier to noise value for valid satellite measurements, where the drop comprises a difference between the smoothed carrier to noise values and a present carrier to noise value;
calculating an average jammer power to noise power value, based on the jammer power to noise power value;
calculating an instantaneous carrier to noise value based on the average jammer power to noise power value and the smoothed carrier to noise value;
determining whether to exclude signals received from the at least one satellite from calculations of global positioning data based on a comparison of the instantaneous carrier to noise value to an exclusion threshold based on the variance of the carrier to noise values from the at least one global navigation satellite system receiver; and
when the signals received from the at least one satellite are excluded, monitoring the signals received from the at least one satellite for readmittance to the calculation of global positioning data.

13. The method of claim 12, wherein determining whether to exclude the signals comprises:
calculating the exclusion threshold based on the variance of carrier to noise values; and
comparing the instantaneous carrier to noise value against the exclusion threshold.

14. The method of claim 12, wherein monitoring the signals for readmittance comprises:
calculating a readmittance threshold based on the variance of carrier to noise values;
comparing the instantaneous carrier to noise value against the readmittance threshold;
determining whether readmitting the signals improves the calculation of global positioning data; and
readmitting the signals if the instantaneous carrier to noise value exceeds the readmittance threshold and the received signal improves the performance of global positioning data.

15. The method of claim 14, wherein determining that readmitting the signals improves the calculation of global positioning data comprises determining whether an error in a pseudorange decreases when the signals are readmitted.

16. The method of claim 12, further comprising verifying that the signals associated with the at least one satellite are consistent for a single receiver.

17. The method of claim 12, wherein calculating a smoothed carrier to noise value comprises waiting for carrier to noise values from the at least one receiver to converge before using the smoothed carrier to noise value.

18. The method of claim 12, further comprising determining whether to alter the calculations of global positioning data based on the comparison of the average jammer power to noise power value and a pre-defined jammer power mask, wherein the jammer power mask is a power spectral density level that defines regulatory and performance limits for radio frequency interference.

19. A program product for monitoring broadband radio frequency interference, the program product comprising a plurality of instructions tangibly stored on a non-transitory storage medium, the instructions operable when executed, to cause a processing unit to:
calculate a set of statistics based on at least one received signal associated with at least one receiver and at least one satellite, wherein the set of statistics include a smoothed carrier to noise value and an instantaneous carrier to noise value for the at least one received signal;
detect broadband radio frequency interference by comparing the smoothed carrier to noise value to the present carrier to noise value, and computing a jammer power to noise power value based on an average difference between the smoothed carrier to noise value and a present carrier to noise value, and then computing an instantaneous carrier to noise value from the smoothed carrier to noise value and a jammer power to noise power value, wherein the at least one received signal is excluded from calculation of global positioning data based on the comparison of the instantaneous carrier to noise value to an exclusion threshold, wherein the exclusion threshold is calculated based on the variance of the carrier to noise values from the at least one receiver; and when the at least one received signal is excluded, monitor the at least one received signal for readmittance to the calculation of global positioning data.

20. The program product of claim 19, wherein the plurality of instructions cause a processing unit to compare the instantaneous carrier to noise value against the exclusion threshold.

* * * * *